(12) United States Patent
Imafuji et al.

(10) Patent No.: US 8,130,280 B2
(45) Date of Patent: Mar. 6, 2012

(54) ELECTRONIC CAMERA

(75) Inventors: Kazuharu Imafuji, Kawasaki (JP);
Toshiharu Matsuda, Souka (JP); Kimio Uematsu, Fuji (JP)

(73) Assignee: Nikon Corporation, Tokyo (JP)

( * ) Notice: Subject to any disclaimer, the term of this patent is extended or adjusted under 35 U.S.C. 154(b) by 471 days.

(21) Appl. No.: 12/232,647

(22) Filed: Sep. 22, 2008

(65) Prior Publication Data

US 2009/0096896 A1 Apr. 16, 2009

(30) Foreign Application Priority Data

Sep. 26, 2007 (JP) .................................. 2007-249803

(51) Int. Cl.
*H04N 5/228* (2006.01)
(52) U.S. Cl. ................ 348/222.1; 348/227.1; 348/228.1; 348/229.1; 348/234
(58) Field of Classification Search ............... 348/222.1, 348/227.1, 228.1, 229.1, 234–239, 252; 382/162, 382/167, 199
See application file for complete search history.

(56) References Cited

U.S. PATENT DOCUMENTS

| | | | |
|---|---|---|---|
| 5,801,773 A | 9/1998 | Ikeda | |
| 6,204,881 B1 | 3/2001 | Ikeda et al. | |
| 6,825,884 B1 | 11/2004 | Horiuchi | |
| 7,301,563 B1* | 11/2007 | Kakinuma et al. | 348/208.13 |
| 7,826,671 B2* | 11/2010 | Zhou et al. | 382/232 |
| 7,839,932 B2* | 11/2010 | Kuppens et al. | 375/240.23 |
| 2002/0196340 A1* | 12/2002 | Kato et al. | 348/148 |
| 2003/0001962 A1 | 1/2003 | Sakurai | |
| 2003/0133035 A1 | 7/2003 | Hatano | |
| 2004/0051790 A1 | 3/2004 | Tamaru et al. | |
| 2004/0207734 A1 | 10/2004 | Horiuchi | |

FOREIGN PATENT DOCUMENTS

| | | |
|---|---|---|
| JP | A-7-131718 | 5/1995 |
| JP | A-08-214211 | 8/1996 |
| JP | B2-2522015 | 8/1996 |
| JP | A-2000-228747 | 8/2000 |
| JP | A-2002-369074 | 12/2002 |
| JP | A-2003-319269 | 11/2003 |
| JP | A-2004-248061 | 9/2004 |
| JP | A-2007-049648 | 2/2007 |

OTHER PUBLICATIONS

Dec. 27, 2011 Office Action issued in JP Application No. 2007-249803 (with English translation).

* cited by examiner

*Primary Examiner* — Yogesh Aggarwal
(74) *Attorney, Agent, or Firm* — Oliff & Berridge, PLC

(57) ABSTRACT

An electronic camera includes: an imaging device that captures a subject image and outputs image signals; an image synthesizing device that performs image synthesis to generate a single image by using a plurality of sets of image signals obtained on different imaging conditions by the imaging device; and a control device that determines whether or not to perform the image synthesis with the image synthesizing device based on a predetermined determination condition, and, when it is determined to perform the image synthesis, controls the image synthesizing device so as to perform the image synthesis.

18 Claims, 9 Drawing Sheets

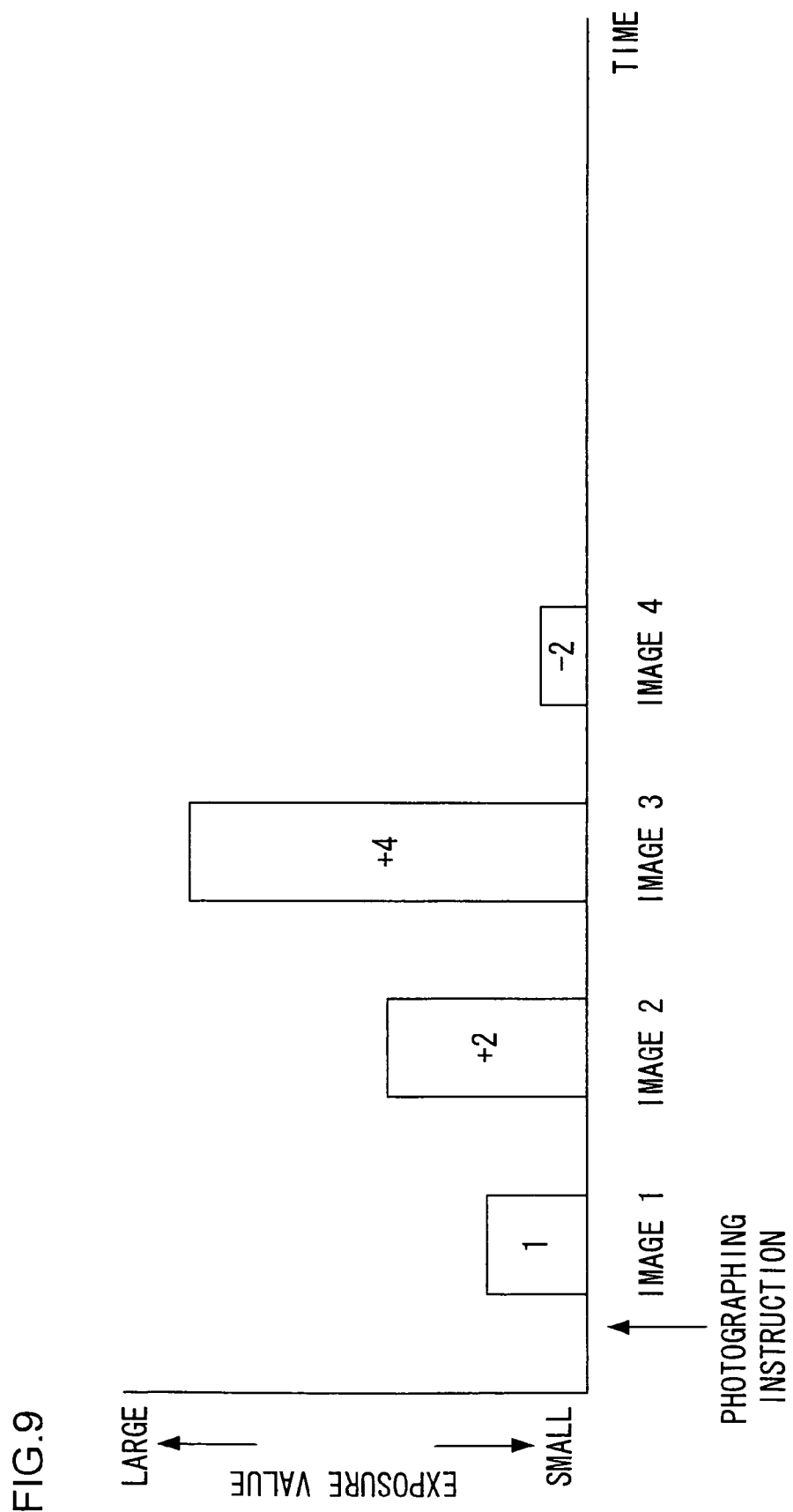

ELECTRONIC CAMERA

INCORPORATION BY REFERENCE

The disclosure of the following priority application is herein incorporated by reference:
Japanese Patent Application No. 2007-249803 filed Sep. 26, 2007

BACKGROUND OF THE INVENTION

1. Field of the Invention
The present invention relates to an electronic camera.
2. Description of Related Art
Japanese Laid Open Patent Publication No. H7-131718 discloses a camera that synthesizes a plurality of images.

It is difficult for cameras in the prior art to determine necessity of image synthesis, therefore, there has been a chance to perform unnecessary processing even when synthesis is not required.

SUMMARY OF THE INVENTION

An electronic camera according to a first aspect of the present invention includes: an imaging device that captures a subject image and outputs image signals; an image synthesizing device that performs image synthesis to generate a single image by using a plurality of sets of image signals obtained on different imaging conditions by the imaging device; and a control device that determines whether or not to perform the image synthesis with the image synthesizing device based on a predetermined determination condition, and, when it is determined to perform the image synthesis, controls the image synthesizing device so as to perform the image synthesis.

According to a second aspect of the present invention, it is preferable that the electronic camera according to the first aspect further includes a photometric device that performs a photometric calculation using the image signals, and that the control device determines whether or not to perform the image synthesis with the image synthesizing device based on a brightness distribution of an image obtained by the photometric calculation by the photometric device.

According to a third aspect of the present invention, in the electronic camera according to the second aspect, it is preferable that the control device determines whether or not to perform the image synthesis with the image synthesizing device using a difference between a maximum luminance value and a minimum luminance value obtained by the photometric calculation.

According to a fourth aspect of the present invention, in the electronic camera according to the third aspect, if the control device determines to perform the image synthesis with the image synthesizing device, the control device may decide a number of the plurality of sets of the image signals used for the image synthesis based on the difference between the maximum luminance value and the minimum luminance value.

According to a fifth aspect of the present invention, in the electronic camera according to the first aspect, it is preferable that each of the plurality of sets of the image signals used by the image synthesizing device to perform the image synthesis are those obtained by the imaging device at a frame rate of more than several tens of frames per second in response to an instruction for photography.

According to a sixth aspect of the present invention, it is preferable that the electronic camera according to the first aspect further includes a photometric device that performs a photometric calculation using the image signals, and that the control device determines whether or not to perform the image synthesis with the image synthesizing device based on a maximum value or a minimum value of image signals captured by the imaging device in response to an instruction for photography, on an imaging condition based on average brightness of an image obtained by the photometric calculation by the photometric device.

According to a seventh aspect of the present invention, in the electronic camera according to the sixth aspect, it is preferable that the control device determines whether or not to perform the image synthesis with the image synthesizing device according to a number of image signals that exceed a first predetermined value among the image signals captured in response to the instruction for photography.

According to a eighth aspect of the present invention, in the electronic camera according to the sixth aspect, the control device may determine whether or not to perform the image synthesis with the image synthesizing device according to a number of image signals that fall short of a second predetermined value among the image signals captured in response to the instruction for photography.

According to a ninth aspect of the present invention, in the electronic camera according to the first aspect, the control device may determine whether or not to perform the image synthesis with the image synthesizing device according to a photographing mode that has been set on the electronic camera.

According to a tenth aspect of the present invention, in the electronic camera according to the first aspect, the image synthesizing device may generate the single image that has a range of signal value wider than a range of signal value of each of the plurality of sets of the image signals used for the image synthesis.

According to a eleventh aspect of the present invention, in the electronic camera according to the second aspect, it is preferable that the control device determines whether or not to perform the image synthesis with the image synthesizing device based on a brightness distribution of a live preview image obtained before an instruction for photography by the photometric calculation.

According to a twelfth aspect of the present invention, in the electronic camera according to the eleventh aspect, if the control device determines to perform the image synthesis with the image synthesizing device, the control device may decide a number of the plurality of sets of the image signals used for the image synthesis and an imaging condition for obtaining the plurality of sets of the image signals, using a difference between a maximum luminance value and a minimum luminance value of image signals that make up a plurality of live preview images obtained on different imaging conditions by the imaging device.

According to a thirteenth aspect of the present invention, in the electronic camera according to the twelfth aspect, a length of time required to obtain the plurality of sets of the image signals used for the image synthesis may be displayed on a display device before the instruction for photography as a shutter speed.

According to a fourteenth aspect of the present invention, in the electronic camera according to the sixth aspect, if the control device determines to perform the image synthesis with the image synthesizing device, the control device may control the imaging device so as to obtain image signals on different imaging conditions, and, when the obtained image signals include equal to or more than a predetermined number of image signals which exceed a first predetermined value, or when the obtained image signals include equal to or more than a predetermined number of image signals which fall short of a second predetermined value smaller than the first predetermined value, the control device may control the imaging device so as to obtain image signals on yet another different imaging condition.

BRIEF DESCRIPTION OF THE DRAWINGS

FIG. 9 is a figure that explains an example of exposure value of a plurality of images to be obtained.

DESCRIPTION OF PREFERRED EMBODIMENTS

Preferred embodiments for implementation of the present invention will now be explained with reference to the drawings.

First Embodiment

Figure 1:
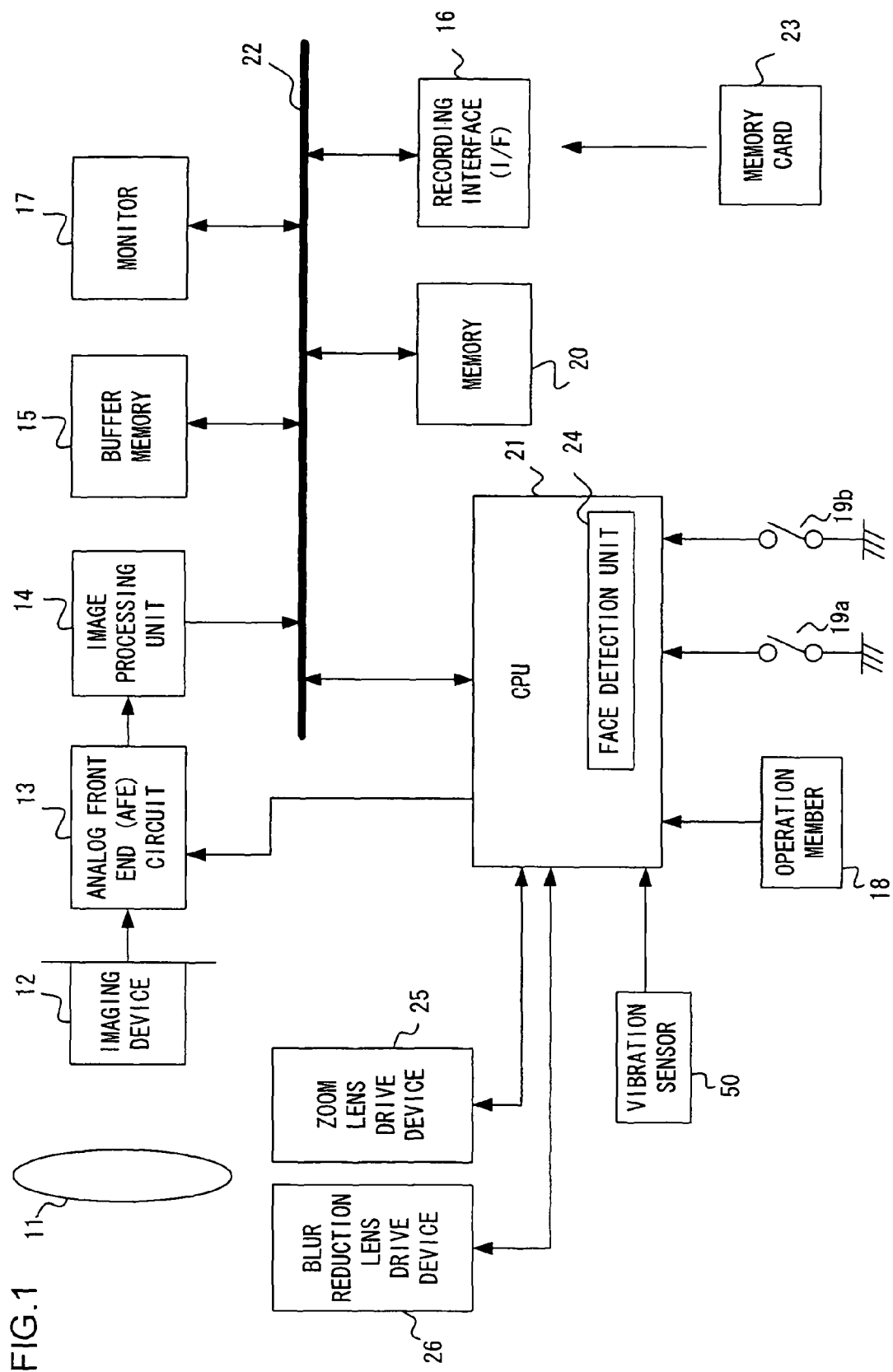
FIG. 1 is a block diagram that shows a configuration of an electronic camera according to a first embodiment of the present invention.

FIG. 1 is a block diagram that shows an example of a configuration of an electronic camera according to the first embodiment of the present invention. In the FIG. 1, the electronic camera includes an imaging optical system 11, an image sensor 12, an analog front end (AFE) circuit 13, an image processing unit 14, a buffer memory 15, a recording interface (I/F) 16, a monitor 17, an operation member 18, a halfway press switch 19a, a full press switch 19b, a memory 20, a CPU 21, a zoom lens drive device 25, a blur reduction lens drive device 26, and a vibration sensor 50.

Each of the CPU 21, the memory 20, the recording interface 16, the image processing unit 14, the buffer memory 15, and the monitor 17 is connected with each other through a bus 22.

The imaging optical system 11 includes a plurality of lens groups including a zoom lens, a focusing lens, and a blur reduction lens, and provides a subject image on a light receiving surface of the image sensor 12. It should be understood that, in order to simplify FIG. 1, the imaging optical system 11 is figured as a single lens.

The image sensor 12 includes for example a complementary metal-oxide semiconductor (CMOS) imaging sensor with its light receiving elements arrayed two-dimensionally on its light receiving surface or the like. The image sensor 12 generates analog image signals by photoelectrically converting a subject image formed by a light flux that passes through the imaging optical system 11. The analog image signals generated by the image sensor 12 is input into the AFE circuit 13.

The AFE circuit 13 performs a gain adjustment (signal amplification according to a designated ISO sensitivity and the like) to analog image signals. In particular, the AFE circuit 13 changes imaging sensitivity (exposure sensitivity) in a predetermined range (for instance, from a value corresponding to ISO 50 to a value corresponding to ISO 3200) according to an instruction for sensitivity settings from the CPU 21. An imaging sensitivity is termed an ISO sensitivity because it is represented by a corresponding ISO value. Moreover, the AFE circuit 13 converts image signals after analog processing into digital data by a built-in analog/digital converter circuit. The digital image data generated by the AFE circuit 13 is input into the image processing unit 14.

The image processing unit 14 performs image synthesis processing described below in addition to various image processing (color interpolation, gradation conversion, edge enhancement, white balance adjustment, and so on) to the digital image data.

The buffer memory 15 temporarily stores image data in pre-processing or post-processing of image processing by the image processing unit 14. The recording interface 16 is provided with a connector (not figured herein). The connector is connected with a recording medium 23. The recording interface 16 writes data to the connected recording medium 23 and reads data from the recording medium 23. The recording medium 23 includes a memory card with a built-in semiconductor memory, a hard disk drive, or the like.

The monitor 17, which is a display device provided on the back side of the electronic camera, includes a liquid crystal panel, and displays an image, an operation menu, and/or the like in response to an instruction from the CPU 21. The operation member 18 includes a mode dial operated by the user, an arrow key, a confirm button, and so on. The operation member 18 sends out operation signals according to each operation such as a mode switch operation or a menu select operation to the CPU 21.

Each of the halfway press switch 19a and the full press switch 19b outputs an ON signal to the CPU 21 in conjunction with a pressing operation of a release button (not figured herein). The ON signal from the switch 19a (halfway press operation signal) is output when the release button is pressed about halfway down of a normal stroke, and the output of the signal is cancelled when the press operation with halfway stroke is cancelled. The ON signal from the switch 19b (full press operation signal) is output when the release button is fully pressed down, and the output of the signal is cancelled when the press operation with a full stroke is cancelled. The halfway press operation signal directs the CPU 21 to start preparing to image. The full press operation signal directs the CPU 21 to start obtaining images for recording.

The CPU 21 controls operations by the electronic camera overall by executing a program stored in a ROM (not figured herein). The CPU 21 performs an autofocus (AF) operation control, an automatic exposure (AE) calculation, an auto white balance calculation, and the like. The AF operation uses, for example, a contrast detection method that detects a focus position of a focusing lens (not figured herein) based on contrast information of a live preview image. The live preview image (or through image) is an image for monitoring that the image sensor 12 continuously obtains before being directed for imaging. Usually, the image for monitoring is an image culled at a predetermined rate. It should be understood that the CPU 21 may be configured to perform an autofocus adjustment using a phase difference detection method in place of the contrast detection method.

The CPU 21 functions also as a face detection unit 24. The face detection unit 24 detects a face area of a subject included in a live preview image. In face detection processing, features such as an edge point of each of the eyebrows, the eyes, the nose, and the lips of a subject are extracted using any known feature extraction process, and whether or not the detected area is a face area is determined based on extracted features. It should be understood that the face detection unit 24 may be configured to obtain a correlation function between live preview image and reference data (face image and the like) prepared in advance, and to determine that the detected area is a face area if the correlation function exceeds a predetermined threshold.

The vibration sensor 50 detects movements in each of yaw direction and pitch direction of the electronic camera, and sends out each of the detection signals to the CPU 21.

In response to an instruction from the CPU 21, the blur reduction lens drive device 26 moves a blur reduction lens (not figured herein) included in the imaging optical system 11 in a direction orthogonal to an optical axis. In response to a detection signal from the vibration sensor 50, the CPU 21 sends an instruction for driving the blur reduction lens to the blur reduction lens drive device 26 so as to eliminate the impact of the detected vibration. This controls relative movement of subject image on the image sensor 12, which results from vibration of the electronic camera.

In response to a direction from the CPU 21, the zoom lens drive device 25 moves a zoom lens (not figured herein) included in the imaging optical system 11 in a direction of an optical axis. In response to a zoom operation signal from the operation member 18, the CPU 21 sends an instruction for driving the zoom lens to the zoom lens drive device 25.

The electronic camera according to the present embodiment includes a photographing mode for recording an image into which a plurality of images are synthesized. Being set to a "synthesis auto" mode which allows image synthesis, the electronic camera determines necessity of synthesis at the time of imaging. If the electronic camera determines that synthesis is necessary, it obtains and synthesizes a plurality of images so as to record a synthetic image. The plurality of images (actual images obtained by a single full press operation of the release button) are obtained at a frame rate of, for example, several tens of frames per second (for instance, 80 fps). If the electronic camera determines that, on the other hand, synthesis is not necessary, the electronic camera obtains and records a single image as per usual. The "synthesis auto" mode is set on the electronic camera by a mode dial operation.

The flow of processing performed when the electronic camera is set to the "synthesis auto" mode is now explained with reference to the flowchart of FIG. 2. Being set to the "synthesis auto" mode, the CPU 21 runs a program to execute the release stand-by process of FIG. 2.

<Release Stand-by Process>

In the release stand-by process, the CPU 21 repeatedly obtains a live preview image at a frame rate of several tens to a hundred and several tens of frames per second (for example, 60 fps to 120 fps) so as to perform an exposure calculation and a focus adjustment described below. And, the CPU 21 stands by for a release operation while continuously displaying live preview image on the monitor 17. It should be understood that since the electronic camera performs photometric calculation using a signal value that makes up live preview image, it adjusts the imaging sensitivity at the time of obtaining live preview image appropriately according to the signal value obtained in a previous frame. However, by selecting an image of a frame obtained at an imaging sensitivity corresponding to average brightness of image and displaying it on the monitor 17, the electronic camera prevents the brightness of the image displayed on the monitor 17 from fluctuating unnaturally.

Figure 2:
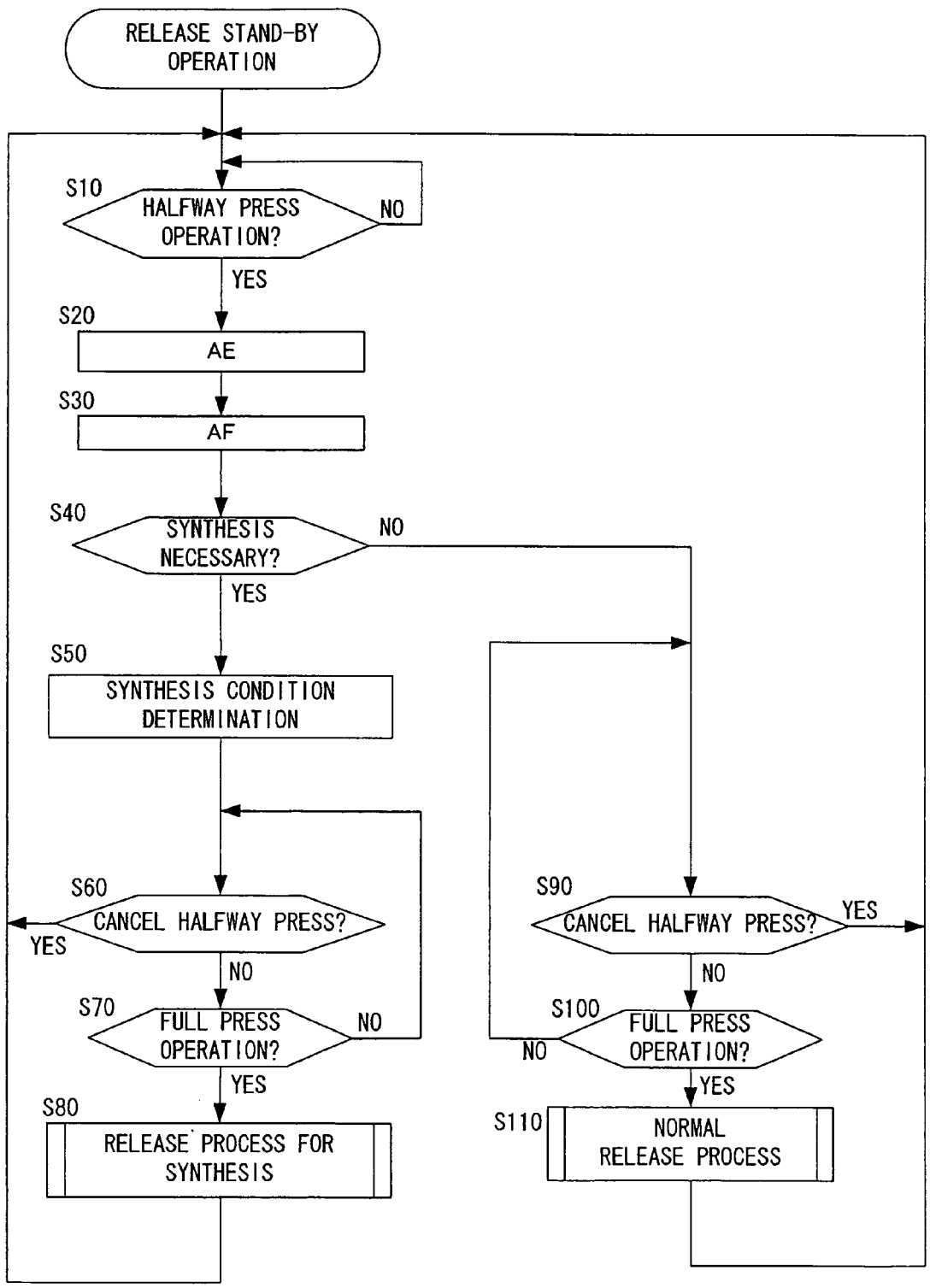
FIG. 2 is a flowchart that describes the flow of release stand-by process performed by a CPU.

In a step S10 of FIG. 2, the CPU 21 determines whether or not a halfway press operation has been performed. If the CPU 21 receives a halfway press operation signal from the halfway press switch 19a, then it makes an affirmative determination in the step S10 and proceeds with the flow of control to a step S20. If the CPU 21 does not receive a halfway press operation signal, then it makes a negative determination in the step S10 and repeats the aforementioned determination process.

In the step S20, the CPU 21 performs an auto exposure (AE) calculation based on an image signal value that makes up the live preview image, and proceeds with the flow of control to a step S30. With this auto exposure calculation, imaging conditions (i.e., imaging sensitivity, storage time, and aperture) are decided based on, for example, average brightness of image. In the present embodiment, signal storage time at the time of imaging is controlled by what is termed an electronic shutter. In the step S30, the CPU 21 performs an auto focus adjustment based on contrast information obtained from the live preview image, and proceeds with the flow of control to a step S40.

Figure 3:
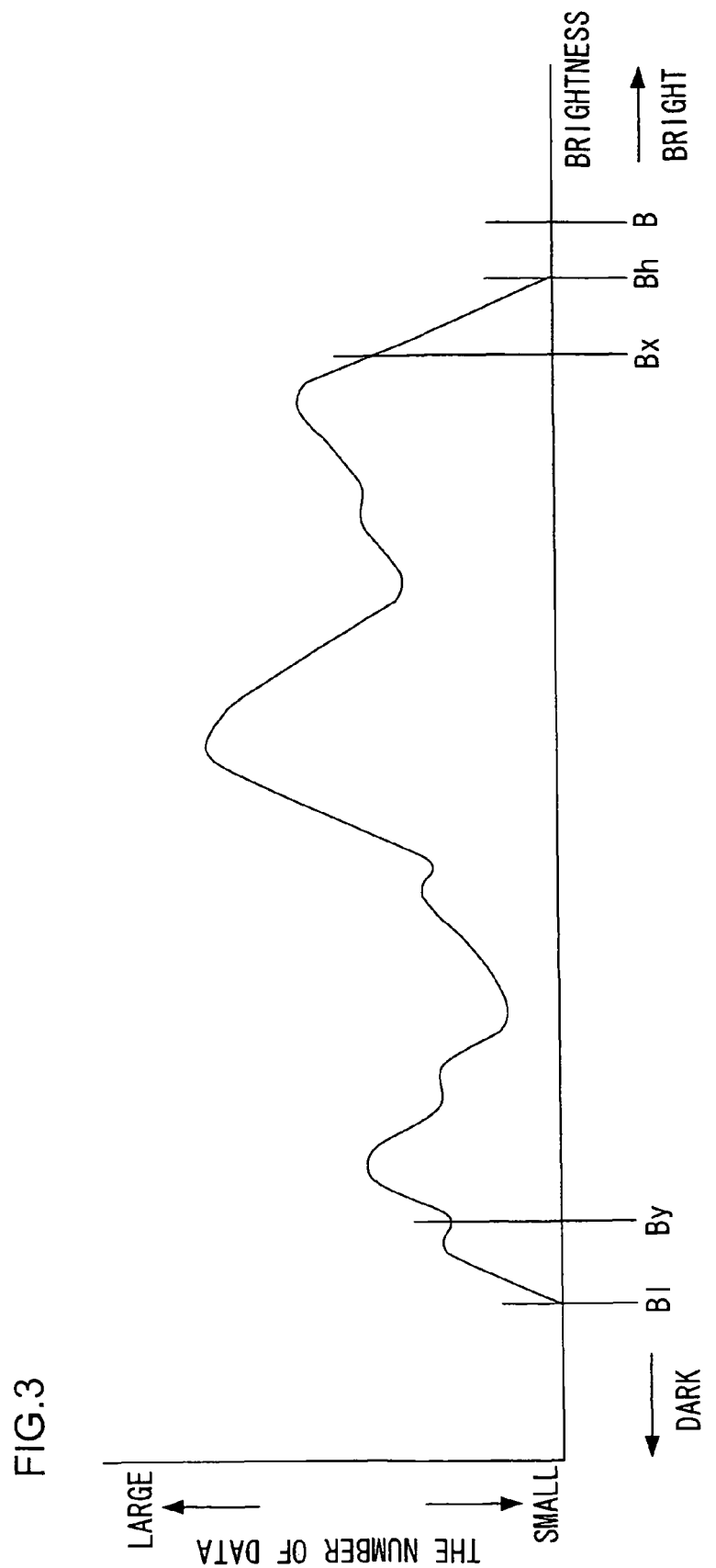
FIG. 3 is a figure that illustrates an example of histogram obtained from preview image signals.

In the step S40, the CPU 21 determines necessity of image synthesis. FIG. 3 is a figure that illustrates an example of histogram obtained from three live preview image signals which were obtained in the step S20 and will be described below (an image obtained by three live preview imaging operations in imaging conditions different from each other). The horizontal axis represents brightness (signal level), while the vertical axis represents the number of data. The CPU 21 obtains the histogram of FIG. 3 by arranging signals corresponding to each pixel position in order of brightness.

When a storage-type sensor such as the image sensor 12 is used, dynamic range depends on accuracy of A/D conversion (bit length). Dynamic range of 8-bit A/D conversion, for example, is approximately within 6 steps in exposure value (Ev). In this case, an imaging range (dynamic range at the time of imaging) is changed according to the brightness of subject because it is difficult to obtain image signals of appropriate values by a single imaging (photometry) for an entire range of, for example, Ev 1 through Ev 20. The change of the imaging range is performed by changing at least one of the imaging sensitivity and the storage time decided in the step S20. In the present embodiment, with the aperture fixed to a value decided in the step S20, while changing the imaging range by changing the imaging sensitivity and the charge storage time, release process for synthesis is performed (described below in a step S80). A method for obtaining live preview images a plurality of times in different imaging conditions set similarly to this release process for synthesis is now explained.

The CPU 21 determines if there is any pixel signal with saturated signal level in the live preview image (the first live preview image) captured in imaging conditions decided based on average brightness of image. The CPU 21 determines that, in case of 8-bit wide, a signal level with a signal value of more than 255 is saturated. The CPU 21 replaces a pixel signal at a pixel position of a saturated signal level among pixel signals of the first live preview image by a signal of corresponding pixel position in another live preview image (the second live preview image). Here, the second live preview image is an image that has been captured so as not to be saturated by reducing the imaging sensitivity or by shortening the storage time compared to the first live preview image. The replacement is executed, taking into consideration difference in the imaging sensitivity (difference in the storage time) between the live preview images. This brings a signal of the brightest area of the live preview image without what is termed whiteout (overexposure/highlight burnout). It should be understood that a whiteout (overexposure) means, for instance, as indicated by Bx in FIG. 3, a case in which histogram is broken with the number of data non-convergent (not less than a predetermined number) at a certain brightness.

On the other hand, the CPU 21 replaces a pixel signal with signal level of less than a predetermined value among pixel signals of the first live preview image captured in imaging condition decided based on average brightness of image by a signal of corresponding pixel position in yet another live preview image (the third live preview image). Here, the third live preview image is an image that has been captured so that the signal level becomes more than a predetermined value by increasing the imaging sensitivity or by lengthening the storage time. The replacement is executed, taking into consideration difference in the imaging sensitivity (difference in the storage time) between the live preview images. This brings a signal of the darkest area of the live preview image without what is termed blackout (underexposure). It should be understood that a blackout (underexposure) means, for instance, as indicated by By in FIG. 3, a case in which histogram is broken with the number of data non-convergent (not less than a predetermined number) at a certain darkness. The histogram of FIG. 3 is obtained based on the above three live preview images which have thus been obtained. This histogram will be explained below in a step S50.

If neither the above described whiteout nor blackout occurs in the pixel signals of the first live preview image captured in imaging condition decided based on average brightness of image, the CPU 21 makes a negative determination in the step S40 and proceeds with the flow of control to a step S90. The flow of control proceeds to the step S90 in a case in which the CPU 21 determines that synthesis is not necessary.

If at least one of the above described whiteout and blackout occurs in the pixel signals of the first live preview image captured in imaging condition decided based on average brightness of image, the CPU 21 makes an affirmative determination in the step S40 and proceeds with the flow of control to the step S50. The flow of control proceeds to the step S50 in a case in which the CPU 21 determines that synthesis is necessary.

In the step S50, the CPU 21 decides synthesis conditions. The synthesis conditions include the number of images obtained for synthesis and imaging conditions at the time of obtaining each of the images. If the difference between the maximum luminance data Bh and the minimum luminance data Bl of the histogram (FIG. 3) obtained in the above described manner is 8 steps, for instance, the CPU 21 obtains images in each of the maximum Ev, an Ev lower than the maximum Ev by 8 steps, and an Ev that interpolates between those. Specifically, the CPU 21 decides (1) the maximum Ev, (2) an Ev lower than the maximum Ev by 2 steps, (3) an Ev lower than the maximum Ev by 4 steps, and (4) an Ev lower than the maximum Ev by 8 steps. In this case, the number of images to be obtained for synthesis is given by (difference between Bh and Bl)/(interpolation step)=8/2=4.

The maximum Ev is decided as follows. The CPU 21 decides a shutter speed Tv and/or an imaging sensitivity Sv according to luminance B (B=Bh+$\Delta$B), in which a predetermined margin $\Delta$B is added to the maximum luminance value Bh, so as to include the maximum luminance value Bh in dynamic range. Here, an aperture Av is set to a predetermined value as described above. In case of the present embodiment, the upper limit of the shutter speed Tv is, for instance, set to $\frac{1}{80}$ seconds. (Tv+Av) which was decided in the above manner corresponds to the maximum Ev. In the maximum Ev, for example, although pixel signals of high luminance area such as the sun are not saturated (free from what is termed whiteout), pixel signals of other areas will be darker than the average brightness of the image.

Then, the CPU 21 decreases the Ev by 2 steps from the maximum Ev. Specifically, it changes the shutter speed Tv and/or the imaging sensitivity Sv. It should be understood that the aperture is fixed to the value described above. If the CPU 21 decreases the Ev by 2 steps, then, although pixel signals of high luminance area such as the sun are saturated, signal value of pixel signals of the average brightness of the image will increase.

Similarly, the CPU 21 decreases the Ev by 4 steps from the maximum Ev. If the CPU 21 decreases the Ev by 4 steps by changing the shutter speed Tv and/or the imaging sensitivity Sv (with the aperture fixed to the value described above), then signal values of pixel signals of the average luminance of the image will further increase.

Furthermore, the CPU 21 decreases the Ev by 8 steps from the maximum Ev. If the CPU 21 decreases the Ev by 8 steps by changing the shutter speed Tv and/or the imaging sensitivity Sv (with the aperture fixed to the value described above), then, although pixel signal level of area with the average luminance of the image is high, pixel signals of the dark area of the image are obtained with signal values which are equal to or more than a predetermined value (free from what is termed blackout).

After deciding synthesis conditions in the above manner, the CPU 21 proceeds with the flow of control to a step S60. In the step S60, the CPU 21 determines whether or not the halfway press operation has been cancelled. If a halfway press operation signal is not input from the halfway press switch 19a to the CPU 21, then the CPU 21 makes an affirmative determination in the step S60, returns the flow of control to the step S10, and repeats the process mentioned above. If a halfway press operation signal has been input from the halfway press switch 19a to the CPU 21, then the CPU 21 makes a negative determination in the step S60 and proceeds the flow of control to a step S70.

In the step S70, the CPU 21 determines whether or not a full press operation is performed. If the CPU 21 receives a full press operation signal from the full press switch 19b, then it makes an affirmative determination in the step S70 and proceeds with the flow of control to the step S80. If the CPU 21 does not receive a full press operation signal, then it makes a negative determination in the step S70 and returns the flow of control to the step S60.

In the step S80, the CPU 21 performs release process for synthesis, and then the flow of control returns to the step S10. Details of the release process for synthesis will be explained hereinafter.

In the step S90, to which the flow of control proceeds after making a negative determination in the step S40, the CPU 21 determines whether or not the halfway press operation has been cancelled. If a halfway press operation signal is not input from the halfway press switch 19a to the CPU 21, then the CPU 21 makes an affirmative determination in the step S90, returns the flow of control to the step S10, and repeats the process mentioned above. If a halfway press operation signal has been input from the halfway press switch 19a to the CPU 21, then the CPU 21 makes a negative determination in the step S90 and proceeds with the flow of control to a step S100.

In the step S100, the CPU 21 determines whether or not a full press operation is performed. If the CPU 21 receives a full press operation signal from the full press switch 19b, then it makes an affirmative determination in the step S100 and proceeds with the flow of control to a step S110. If the CPU 21 does not receive a full press operation signal, then it makes a negative determination in the step S100 and returns the flow of control to the step S90.

In the step S110, the CPU 21 performs normal release process, and then the flow of control returns to the step S10. Details of the normal release process will be explained hereinafter.

<Release Process for Synthesis>

Figure 4:
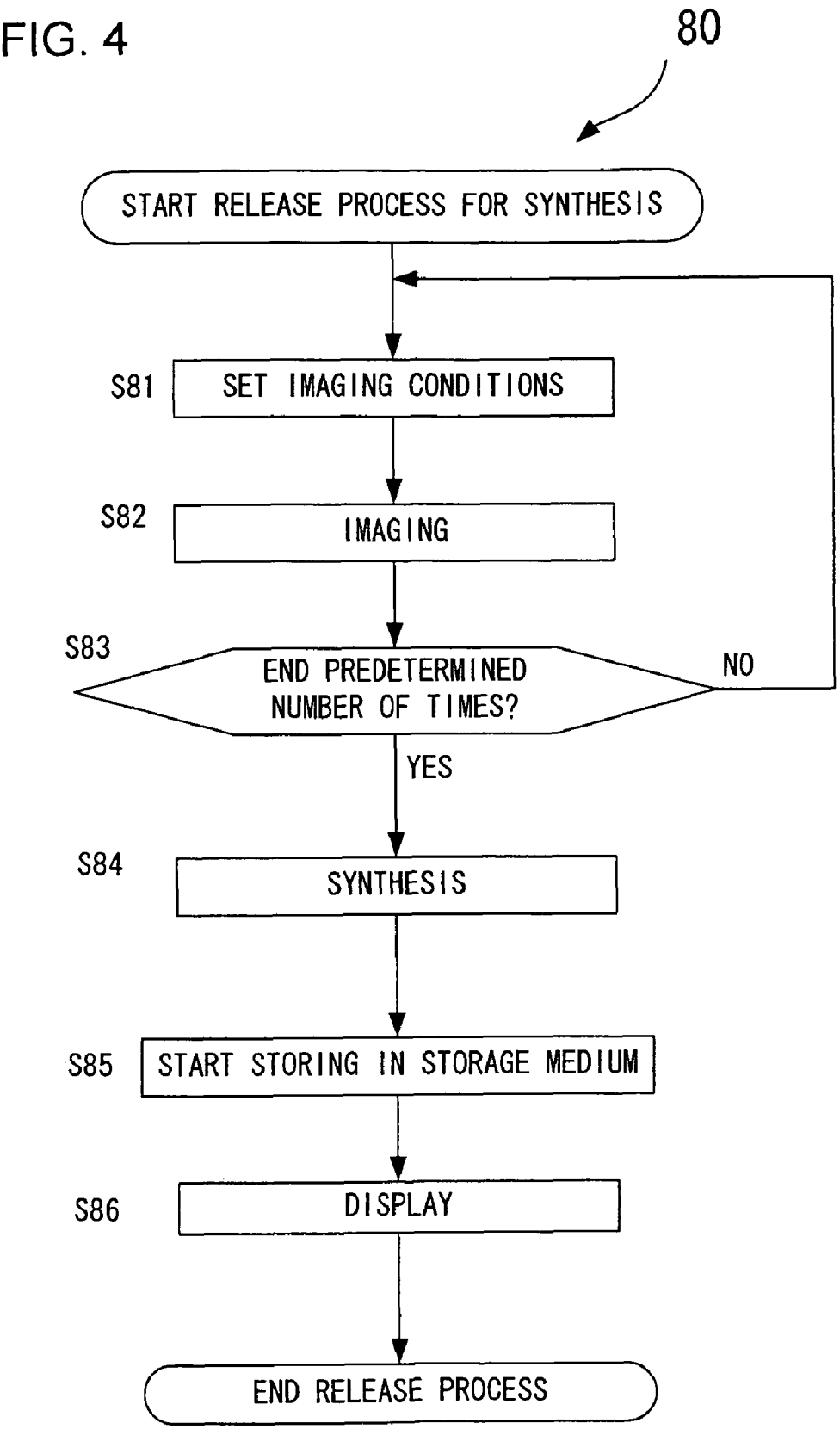
FIG. 4 is a flowchart that describes the flow of release process for synthesis.

The flow of the release process for synthesis in the step S80 is now explained with reference to the flowchart of FIG. 4. In a step S81 of FIG. 4, the CPU 21 sets imaging conditions and proceeds with the flow of control to a step S82. Specifically, it sets a storage time of the image sensor 12 and a gain (imaging sensitivity) of the AFE circuit 13 according to the conditions determined in the step S50 (FIG. 2). In the step S82, the CPU 21 causes the image sensor 12 to capture images, and proceeds with the flow of control to a step S83. This causes imaging (operation for obtaining actual images) in the determined imaging conditions and causes the charge storage signals to be forwarded to the image processing unit 14 via the AFE circuit 13.

Figure 5:
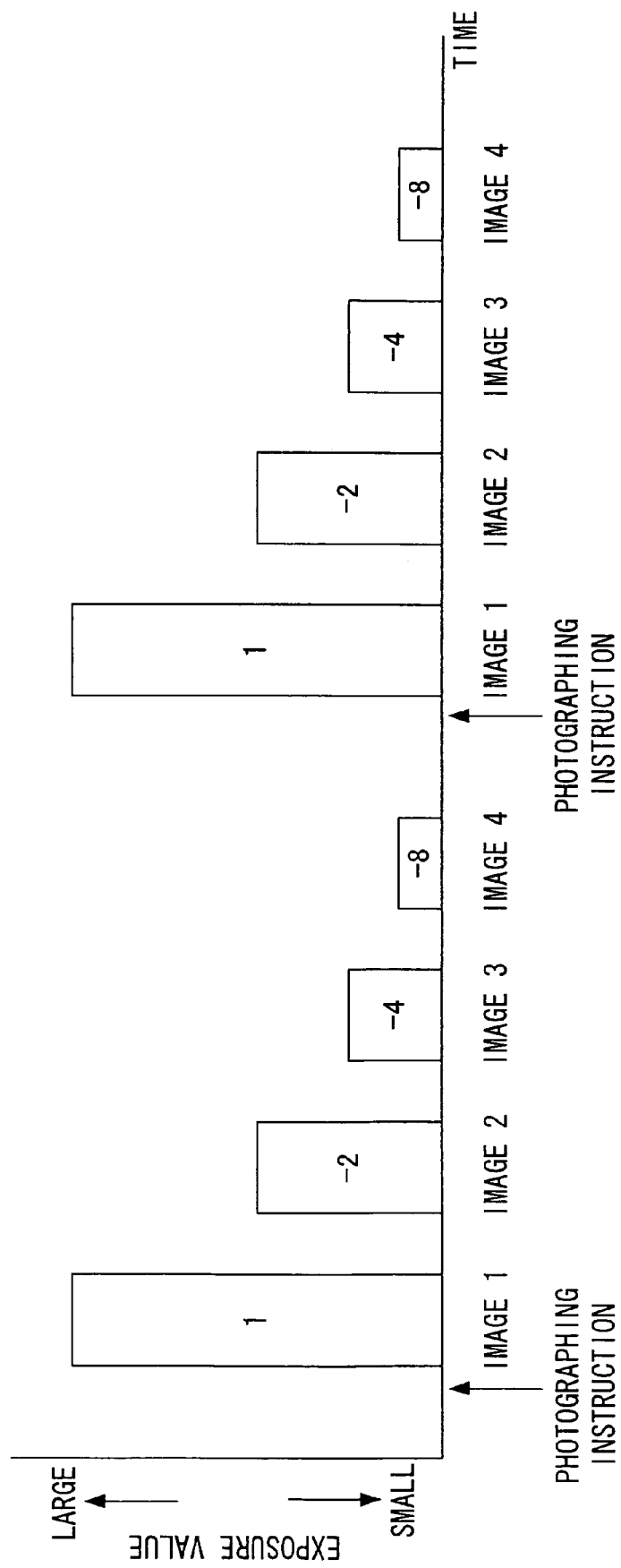
FIG. 5 is a figure that explains an example of exposure value (Ev) of a plurality of images to be obtained.

In the step S83, the CPU 21 determines whether or not a predetermined number of times of imaging have been finished. After finishing imaging of the number of times corresponding to the number of images to be obtained for synthesis (in this example, four times), the CPU 21 makes an affirmative determination in the step S83 and proceeds with the flow of control to a step S84. If the number of times of the imaging falls short of the above number of times, the CPU 21 makes a negative determination in the step S83, returns the flow of control to the step S81, and repeats imaging until the predetermined number of times. This brings four images, IMAGES 1 through 4, with four different Evs according to a single imaging instruction (full press operation signal input). FIG. 5 is a figure that shows an example of Evs of IMAGES 1 through 4 thus obtained. In FIG. 5, IMAGE 2 is an image obtained in an Ev of −2 steps compared to that of IMAGE 1. IMAGE 3 is an image obtained in an Ev of −4 steps compared to that of IMAGE 1. IMAGE 4 is an image obtained in an Ev of −8 steps compared to that of IMAGE 1. It should be understood that FIG. 5 shows that the series of imaging described above (imaging four times in different Evs) is performed every time an imaging instruction is given (every time a full press operation is performed).

In the step S84, the CPU 21 sends an instruction to the image processing unit 14 and causes the image processing unit 14 to synthesize the obtained images. The image processing unit 14 divides brightness into four ranges based on the histogram of FIG. 3 and performs synthesis processing as follows. It should be understood that areas corresponding to pixel positions around the borders of the four ranges are subjected to seamless border treatment. It should be understood that the synthesis is performed using color-interpolated images which include data of each color (for instance, RGB) in each of the pixel positions.

(a) The area corresponding to pixel positions included in the brightest range is represented by the data of IMAGE 1.
(b) The area corresponding to pixel positions included in the second brightest range is represented by the data of IMAGE 2.
(c) The area corresponding to pixel positions included in the third brightest range is represented by the data of IMAGE 3.
(d) The area corresponding to pixel positions included in the fourth brightest (the darkest) range is represented by the data of IMAGE 4.

Figure 6:
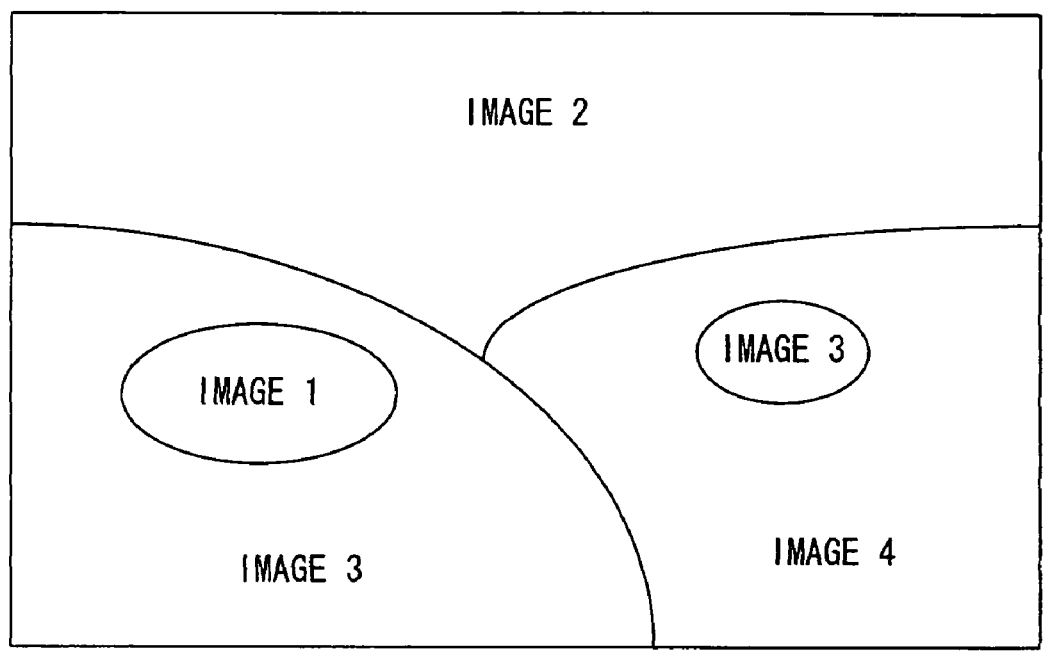
FIG. 6 is a figure that illustrates a post-synthesis image.

FIG. 6 is a figure that illustrates a synthesized image. In the figure, the area "IMAGE 1" indicates that the area is represented by the data by IMAGE 1; the area "IMAGE 2" indicates that the area is represented by the data by IMAGE 2; the area "IMAGE 3" indicates that the area is represented by the data by IMAGE 3; and, the area "IMAGE 4" indicates that the area is represented by the data by IMAGE 4.

After performing the synthesis processing as above, the image processing unit 14 performs a gradation conversion, an edge enhancement, and a white balance adjustment on synthesis image data as shown in FIG. 6. After the image processing ends, the CPU 21 proceeds with the flow of control to a step S85. In the step S85, the CPU 21 starts processing to store the post-processed image data (synthesis image data) into the recording medium 23, and then proceeds with the flow of control to a step S86. In the step S86, the CPU 21 starts processing to display the post-processed synthesis image data on the monitor 17, and then terminates the processing described in FIG. 4.

<Normal Release Process>

Figure 7:
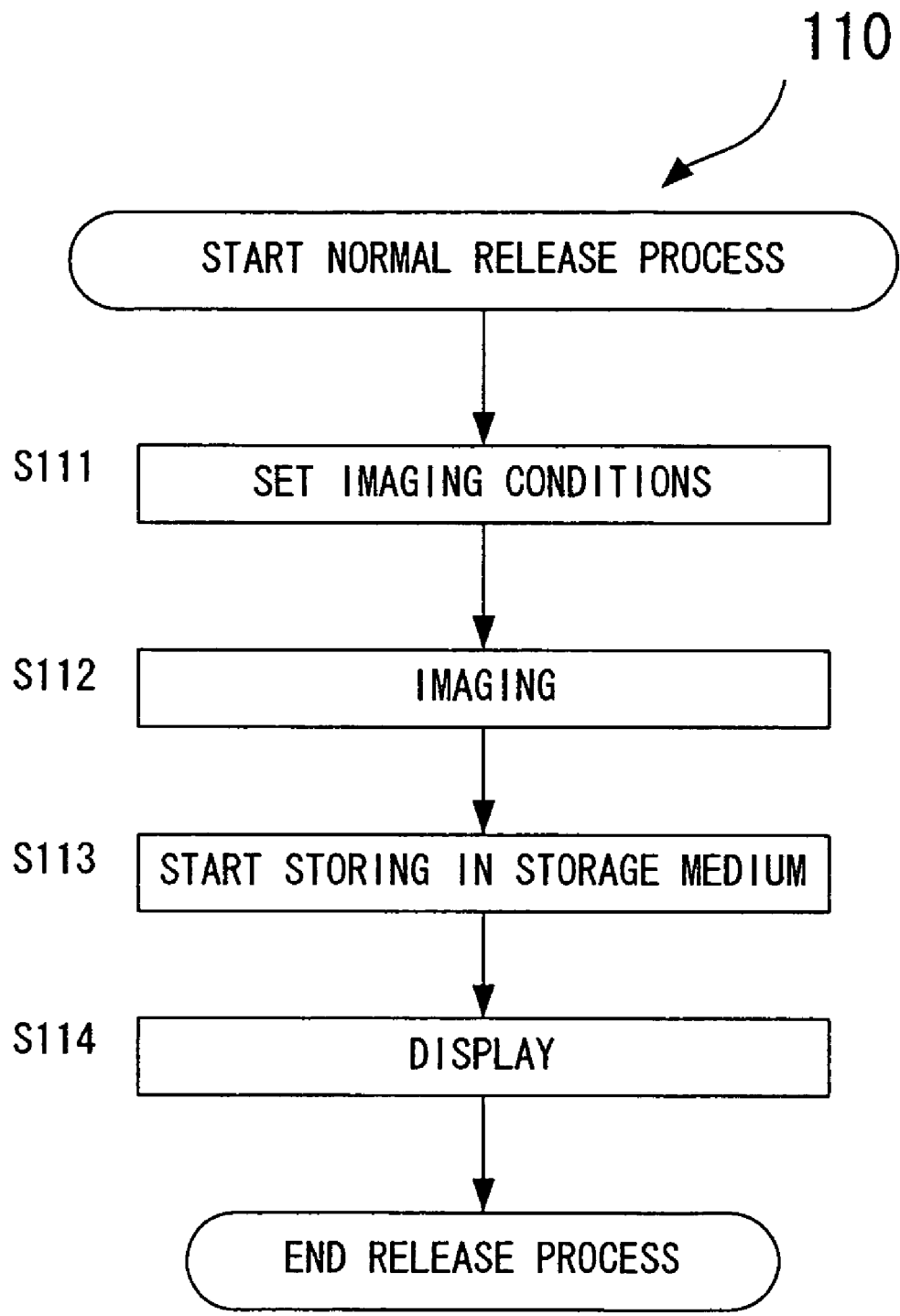
FIG. 7 is a flowchart that describes the flow of normal release process.

The flow of the normal release process in the step S110 is now explained with reference to the flowchart of FIG. 7. In the normal release process, one image is obtained based on a control exposure value obtained in the exposure calculation of the step S20. In a step S111 of FIG. 7, the CPU 21 sets imaging conditions and proceeds with the flow of control to a step S112. Specifically, it sets a charge storage time of the image sensor 12, a gain of the AFE circuit 13, and an aperture value of a diaphragm (not figured herein) according to the control exposure obtained in the step S20. In the normal release process, unless exposure is controlled by an aperture value which has been set in the electronic camera as in the aperture priority auto exposure mode, the aperture value is subject to the control.

In the step S112, the CPU 21 causes the image sensor 12 to capture images and proceeds with the flow of control to a step S113. This causes imaging in the imaging conditions which were set and causes charge storage signals to be forwarded to the image processing unit 14 via the AFE circuit 13. The image processing unit 14 performs a color interpolation, a gradation conversion, an edge enhancement, a white balance adjustment, and the like on the forwarded data.

In the step S113, the CPU 21 starts processing to store the post-processed image data into the recording medium 23, and then proceeds with the flow of control to a step S114. In the step S114, the CPU 21 starts processing to display the post-processed image data on the monitor 17, and then terminates the processing described in FIG. 7.

When performing "release process for synthesis," the CPU 21 displays value of shutter speed on the monitor 17 as imaging conditions in the following manner. For example, if the number of images to obtain for synthesis is four, and if all the shutter speeds Tv of IMAGES 1 through 4 are $1/80$ seconds (frame rate for obtaining image by the image sensor 12 is 80 fps), the CPU 21 displays $(1/80+1/80+1/80+1/80)=1/20$ seconds as s shutter speed.

According to the first embodiment described above, the following operational effects can be achieved.

(1) Since the electronic camera automatically determines either to perform "release process for synthesis" or to perform "normal release process," unlike one with manual switching, the user can concentrate on the photographing operation.

(2) In the "release process for synthesis," since a plurality of images are obtained at a high frame rate (several tens to a hundred and several tens of frames per second) in response to one imaging instruction (full press operation signal input), unlike in the case of what is termed a bracket shooting, the user can enjoy a photographing operation as though it were an one-frame shooting.

(3) Since a plurality of images are obtained with different Ev based on the histogram (FIG. 3), wide range (for example, Ev 1 to Ev 20) exceeding dynamic range for one imaging (photometry) is captured. In other words, since both a bright subject area and a dark subject area are obtained as an image with an appropriate signal value in one of the plurality of the images, an image without whiteout or blackout is obtained.

(4) Since a photometric calculation is performed using a signal value included in a live preview image obtained by the image sensor 12, reduction is achieved in both cost and installation space compared to the case in which a photometric sensor is provided separately from the image sensor 12.

(5) Brightness of a subject field is divided into a plurality of ranges (for instance, four) based on the histogram (FIG. 3). One image is generated from the plurality of the images so as to represent the area corresponding to pixel positions included in the brightest range by the data of IMAGE 1; so as to represent the area corresponding to pixel positions included in the second brightest range by the data of IMAGE 2; so as to represent the area corresponding to pixel positions included in the third brightest range by the data of IMAGE 3; and, so as to represent the area corresponding to pixel positions included in the fourth brightest (the darkest) range by the data of IMAGE 4. This brings an image with wide dynamic range and high quality.

(6) Since the number of images to be obtained for synthesis is determined based on the difference between the maximum luminance data Bh and the minimum luminance data Bl of the histogram (FIG. 3) obtained before an instruction for imaging (step S20), expected length of time to obtain images before a release full press operation is calculated and displayed on the monitor 17.

(Variation 1)

In the first embodiment described above, an example in which the electronic camera is provided with "synthesis auto" mode in which the electronic camera automatically determines either to perform "release process for synthesis" or to perform "normal release process." However, an electronic camera may be configured to switch to perform "release process for synthesis" or to perform "normal release process" by a manual operation. For instance, a mode dial including "synthesis mode" may be provided so that "release process for synthesis" may be selected by the user performing a switching operation of the mode dial.

(Variation 2)

In the first embodiment described above, an example in which the electronic camera automatically determines either to perform "release process for synthesis" or to perform "normal release process" (step S40) according to whether or not whiteout or blackout occurs in a pixel signal of an live preview image based on average brightness of image. Instead, however, it may be configured that the above automatic determination is performed according to whether or not the difference between the maximum luminance data Bh and the minimum luminance data Bl of the histogram (FIG. 3) exceeds a predetermined number of steps. In this case, for instance, the CPU 21 determines "synthesis necessary" if the difference between the maximum luminance data Bh and the minimum luminance data Bl exceeds a predetermined value (value that intrinsically indicates a dynamic range of the imaging device, in the example of the present embodiment, it is 6 steps), and controls the camera so as to perform "release process for synthesis."

(Variation 3)

It may be configured that the electronic camera automatically determines either to perform "release process for synthesis" or to perform "normal release process" (step S40) according to the result of the automatic exposure calculation (step S20). The CPU 21 in variation 3 determines "synthesis necessary" if the charge storage time determined based on average brightness of image is shorter than the lower limit of shutter speed for preventing image blur, and controls the camera so as to perform "release process for synthesis." This brings an image with wide dynamic range and high quality without image blur by performing "release process for synthesis" with limited storage time even when there is a chance of blackout because of a dark subject.

(Variation 4)

It may be configured that in "synthesis auto" mode the electronic camera determines whether or not a major subject moves, and accordingly performs an automatic determination either to perform "release process for synthesis" or to perform "normal release process."

The CPU 21 in variation 4 determines whether or not an amount of change in a subject image between frames of live preview image is equal to or more than a predetermined threshold. For example, if a motion vector between frames calculated from data of the preview image of the previous frame and that of the current frame is equal to or more than a predetermined value, the CPU 21 determines that the subject moves. If the subject moves, the CPU 21 determines "synthesis unnecessary" and controls the camera so as to perform not "release process for synthesis" but "normal release process." In case of photographing a moving subject, performing "normal release process" eliminates possible blurring due to synthesis.

(Variation 5)

It may be configured that the electronic camera automatically determines either to perform "release process for synthesis" or to perform "normal release process," according to a photographing mode that has been set. The CPU 21 in variation 5 determines whether or not the photographing mode is "sports scene" mode. In case of the mode for photographing "sports scene," for instance, the CPU 21 determines "synthesis unnecessary" and controls the camera so as to perform not "release process for synthesis" but "normal release process." In case of photographing a moving subject, performing "normal release process" eliminates possible blurring due to synthesis.

(Variation 6)

The CPU 21 in variation 6 determines whether or not the photographing mode is "distant view (landscape)" mode. In case of the mode for photographing "distant view", for example, the CPU 21 determines "synthesis necessary" and controls the camera so as to perform "release process for synthesis." An image with wide dynamic range and high quality is obtained by performing "release process for synthesis" for an appropriate expression of light and dark such as in photographing landscape. A landscape image is less likely to include a moving subject, therefore, blurring by synthesis is less likely to affect on a synthesis image.

(Variation 7)

The CPU 21 in variation 7 determines whether or not the photographing mode is "portrait" mode. In case of the mode for photographing "portrait", for example, since, similar to the distant view mode, the image is expected to be less likely to include a moving subject, the CPU 21 determines "synthesis necessary" and controls the camera so as to perform "release process for synthesis."

(Variation 8)

It may be configured that in "synthesis auto" mode the electronic camera determines remaining battery charge, and accordingly performs an automatic determination either to perform "release process for synthesis" or to perform "normal release process."

The CPU 21 in variation 8 determines whether or not a remaining battery charge is less than a predetermined value based on detection result by a battery voltage detection circuit which is not figured herein. If the remaining battery charge is less than a predetermined value, the CPU 21 determines "synthesis unnecessary" and controls the camera so as to perform not "release process for synthesis" but "normal release process." Reducing the number of imaging in case the remaining battery charge is low and not performing synthesis processing result in reduction in power consumption.

(Variation 9)

It may be configured that in "synthesis auto" mode the electronic camera performs an automatic determination either to perform "release process for synthesis" or to perform "normal release process" using information on photographing location and information on photographing date and time.

The CPU 21 in variation 9 determines whether or not synthesis is necessary based on location information obtained using a GPS device which is not figured herein and date and time information obtained from a built-in timer circuit in the CPU 21. For instance, if it is estimated that a subject will require a wide dynamic range such as a summer beach or a winter mountain area, the CPU 21 determines "synthesis necessary" and controls the camera so as to perform "release process for synthesis." An image with wide a dynamic range and high quality is obtained by performing "release process for synthesis" for an appropriate expression of light and dark.

(Variation 10)

It may be configured that in "synthesis auto" mode the electronic camera performs an automatic determination either to perform "release process for synthesis" or to perform "normal release process" according to whether or not the electronic camera has been directed to compensate exposure. The CPU 21 in variation 10 determines "synthesis unnecessary," for instance, in case an instruction for exposure compensation has been commanded, and controls the camera so as to perform not "release process for synthesis" but "normal release process." Exposure compensation effect desired by the user is obtained by not performing processing of widening dynamic range.

(Variation 11)

It may be configured that in "synthesis auto" mode the electronic camera performs an automatic determination either to perform "release process for synthesis" or to perform "normal release process" based on a detection signal from the vibration sensor 50. The CPU 21 in variation 11 determines "synthesis necessary" in case a detection value by the vibration sensor 50 exceeds a vibration control range, in other words, effect of shake is difficult to remove even though a blur reduction lens is driven. In order to extract images without image blur among a plurality of images obtained in response to one imaging instruction and to synthesize the extracted images, the CPU 21 controls the camera so as to perform "release process for synthesis."

(Variation 12)

In the description above, it is configured to synthesize the whole area of an image when performing "release process for synthesis." However, a part of an image may be an object of synthesis processing. For example, an object of synthesis processing may be a predetermined range around the center of the image and may be a predetermined range for focus adjustment. A load in synthesis processing is thus reduced compared to synthesizing the whole image.

(Variation 13)

In the above, an example of synthesis of images using a plurality of images obtained after reception of a full press operation signal was described. However, it may be configured to start obtaining images continuously or repeatedly at predetermined intervals after reception of a halfway press operation signal, and to include an image group obtained between the halfway press operation and the full press operation as an object of image synthesis. Here, the plurality of the images obtained after reception of the halfway press operation signal are similar to actual images obtained by the full press operation, and are different from the live preview image mentioned above. This configuration is effective in apparent reduction in release time lag, in particular in the case where the number of images for synthesis is large.

Second Embodiment

Figure 8:
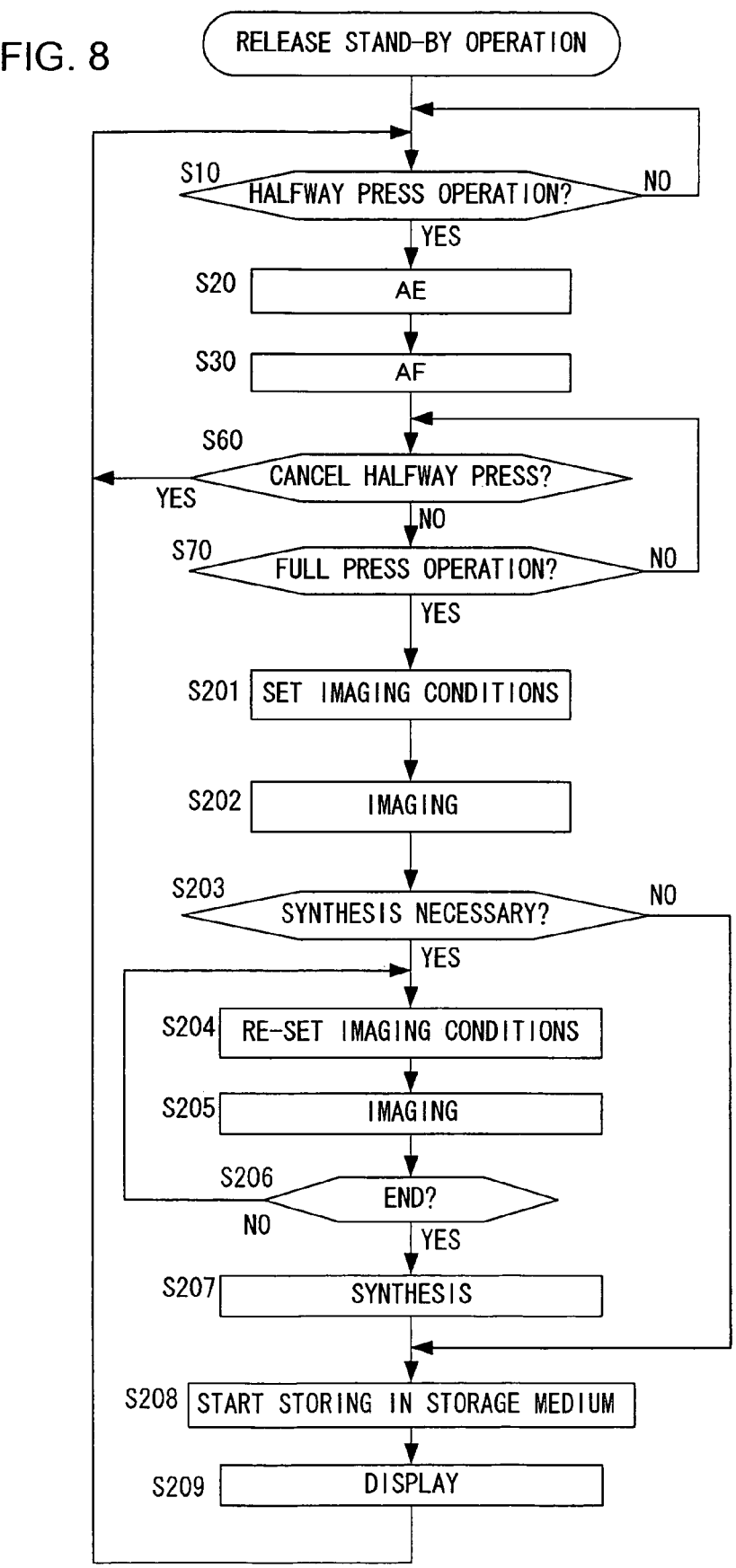
FIG. 8 is a flowchart that describes the flow of release stand-by process according to a second embodiment.

In the second embodiment, imaging conditions of images for synthesis are decided based on image signal values that are included in an image (actual image) obtained according to a photographing instruction. FIG. 8 is a flowchart that describes the flow of release stand-by process according to the second embodiment. The CPU 21 runs a program to execute processing of FIG. 8 in place of that of FIG. 2.

<The Release Stand-by Process>

Because each of processing of the steps S10 through S70 of FIG. 8 is the same of that of the same-numbered steps in FIG. 2, each of them is not described in detail. In a step S201 of FIG. 8, the CPU 21 sets imaging conditions and proceeds with the flow of control to a step S202. Specifically, the CPU 21 sets a charge storage time of the image sensor 12, a gain of the AFE circuit 13, and an aperture value of a diaphragm (not figured herein) according to the control exposure obtained in the step S20.

In the step S202, the CPU 21 causes the image sensor 12 to image and proceeds with the flow of control to a step S203. This causes imaging in the imaging conditions which have been set and forwards the charge storage signal to the image processing unit 14 via the AFE circuit 13.

In the step S203, the CPU 21 determines whether or not image synthesis is necessary. If equal to or more than a predetermined number of saturated components (signal value of over 255, for instance, in case of 8-bit wide) exist in data of the obtained image (actual image obtained in the step S202), or if equal to or more than a predetermined number of components with less than a predetermined signal value exist in the data of the obtained image (equal to or more than a predetermined rate in the obtained image data), then the CPU 21 makes an affirmative determination in the step S203. After the CPU 21 makes an affirmative determination in the step S203 and determines "synthesis necessary", the flow of control proceeds to a step S204.

If more than the predetermined number of saturated components do not exist in the data of the obtained image, and if more than the predetermined number of components with less than the predetermined signal value also do not exist in the data of the obtained image, then the CPU 21 makes a negative determination in the step S203. After the CPU 21 makes a negative determination in the step S203 and determines "synthesis unnecessary", the flow of control proceeds to a step S208.

In the step S204, the CPU 21 re-sets imaging conditions and proceeds with the flow of control to a step S205. Specifically, if the saturated components exist in the data of the obtained image, the CPU 21 changes the shutter speed Tv and imaging sensitivity Sv so as to set an Ev of, for instance, +2 steps compared to the previous Ev. If the components with the signal value less than the predetermined value exist in the data of the obtained image, the CPU 21 changes the shutter speed Tv and imaging sensitivity Sv so as to set an Ev of, for instance, −2 steps compared to the previous Ev. In the step S205, the CPU 21 causes the image sensor 12 to image and proceeds with the flow of control to a step S206. This causes imaging in the imaging conditions which have been re-set and forwards the charge storage signal to the image processing unit 14 via the AFE circuit 13.

In the step S206, the CPU 21 determines whether or not to end obtaining images for synthesis. If equal to or more than the predetermined number of saturated components (signal value of over 255, for instance, in case of 8-bit wide) still exist in the data of the image obtained in the step S205, or if equal to or more than the predetermined number of components with the signal value less than the predetermined value exist in the data of the obtained image, then the CPU 21 makes a negative determination in the step S206. After making a negative determination in the step S206, the CPU 21 returns the flow of control to the step S204 and repeats the processing described above.

If equal to or more than the predetermined number of saturated components do not exist in the data of the plurality of the images obtained in the steps S202 and S205, and if equal to or more than the predetermined number of components with the signal values less than the predetermined value also do not exist, then the CPU 21 makes an affirmative determination in the step S206, and proceeds with the flow of control to a step S207. The flow of control proceeds to the step S207 is a case in which the CPU 21 determines to end image obtaining. FIG. 9 is a figure that explains an example of Ev of IMAGES 1 through 4 that have been obtained. In FIG. 9, IMAGE 1 is an image obtained (step S202) in imaging conditions (imaging sensitivity, storage time, and aperture) based on average brightness of the image. IMAGE 2 is an image obtained in an Ev of +2 steps compared to that of IMAGE 1. IMAGE 3 is an image obtained in an Ev of +4 steps compared to that of IMAGE 1. IMAGE 4 is an image obtained in an Ev of −2 steps compared to that of IMAGE 1.

In the step S207 of FIG. 8, the CPU 21 sends a direction to the image processing unit 14 and causes the image processing unit 14 to synthesize the obtained images. The image processing unit 14 divides brightness into four ranges based on the histogram of FIG. 3 and performs synthesis processing as follows. An example of synthesis processing using IMAGES 1 through 4 shown in FIG. 9 will be explained herein. In common with the first embodiment, synthesis is performed using color-interpolated images, and areas corresponding to pixel positions around the borders of the four ranges are subjected to seamless border treatment.
(a) The area corresponding to pixel positions included in the brightest range is represented by the data of IMAGE 3.
(b) The area corresponding to pixel positions included in the second brightest range is represented by the data of IMAGE 2.
(c) The area corresponding to pixel positions included in the third brightest range is represented by the data of IMAGE 1.
(d) The area corresponding to pixel positions included in the fourth brightest (the darkest) range is represented by the data of IMAGE 4.

This brings a synthesized image as shown in FIG. 6, similarly to the first embodiment. It should be understood that if the number of obtained images for synthesis is smaller than 4, the number of images to synthesize is decreased, while if the number of obtained images for synthesis is larger than 4, the number of images to synthesize is increased. After performing the synthesis processing as described above, the image processing unit 14 performs a gradation conversion, an edge enhancement, and a white balance adjustment. After the image processing ends, the CPU 21 proceeds with the flow of control to the step S208.

In the step S208, the CPU 21 starts processing to store image data after color interpolation, gradation conversion, edge enhancement, and white balance adjustment into the recording medium 23, and then proceeds with the flow of control to a step S209. In the step S209, the CPU 21 starts processing to display the post-processed image data on the monitor 17, and then terminates the processing described in FIG. 8.

According to the second embodiment described above, the following operational effects can be achieved.

(1) Since the CPU 21 determines imaging conditions of an image for synthesis, which is to be obtained next, based on the image signal value included in the image having obtained according to the imaging instruction, necessity for obtaining the next image is determined more accurately, compared to determination based on signal value of live preview image.

(2) Since the next image is not obtained unless the obtained image actually includes saturated components or unless the obtained image actually includes signal values less than a predetermined value, the number of images for synthesis is reduced more, compared to the case in which the next image is obtained when there is a chance of including the saturated components or the signal value less than the predetermined value.

(Variation 14)

At the re-setting of imaging conditions in the step S204, the CPU 21 may determine the number of Ev steps to be increased according to an area of image made up with saturated components included in the obtained image. And, the CPU 21 may determine the number of Ev steps to be decreased according to an area of image made up with data of less than a predetermined value included in the obtained image.

(Variation 15)

In the step S206, the CPU 21 may determine whether or not to end obtaining images for synthesis according to the number of increased or decreased steps of Ev. For instance, the CPU 21 performs a determination so as not to set an imaging condition that exceeds a predetermined number of steps (for example, +6 steps) to the Ev of the image obtained firstly (step S202). Or, the CPU 21 performs a determination so as not to set an imaging condition that falls short of a predetermined number of steps (for example, −4 steps) to the Ev of the image obtained firstly (step S202).

(Variation 16)

In the first embodiment and the second embodiment described above, it is configured to perform "release process for synthesis" or "normal release process." However, it may be configured to perform both of them. In this case, the CPU 21 stores each of the image data after synthesis process and the image data by normal imaging into the buffer memory 15, and stands by for an operation signal from the operation member 18.

The CPU 21 simultaneously or sequentially displays a confirmation image by the image data after synthesis process and a confirmation image by the image data by normal imaging on the monitor 17, in response to an operation signal from the operation member 18. Then, after receiving the operation signal that directs a storage of one of the images from the operation member 18, the CPU 21 stores the image data which corresponds to the image whose storage was directed into the recording medium 23. This allows the user to compare both of the images and have the desired one stored. It should be understood that it may be configured to store not only one of them but also both of them.

(Variation 17)

In the first embodiment and the second embodiment described above, for performing "release process for synthesis", not only a single set but also more than two sets of IMAGES 1 through 4 described above may be imaged repeatedly. In this case, the CPU 21 selects a synthetic image using an appropriate set of images among the plurality of sets of images and stores the selected image into the recording medium 23. In case of photographing a person, for instance, a synthesis image using, not a set that includes images with the subject's eyes closed or images with the subject blurring, but a set does not include those images will be a target to be stored. And, it is preferable not to store a synthesis image using a set that includes images with different state of color due to flicker of a fluorescent lamp.

(Variation 18)

In the above, an example of image synthesis in which a dynamic range of an image is expressed widely by synthesizing images is described. However, images may be synthesized so as to deeply express depth of field. In variation 18, a plurality of images are obtained in "release process for synthesis," while, without changing the imaging conditions for each image, shifting the focusing lens so as to differ focus conditions among the images. Here, the imaging conditions of each of the images include, for instance, a storage time, an imaging sensitivity, and an aperture value according to the control exposure obtained in the step S20.

The CPU 21 in variation 18 displays a confirmation image of each image data before synthesis process on the monitor 17 in response to an operation signal from the operation member 18, and synthesizes designated two image data in response to an operation signal for synthesis from the operation member 18. In the synthesis processing, a background, which is an area other than a major subject, is extracted from the most focused image, and is replaced by data of pixel positions corresponding to that in other image. The image data after synthesis process is stored in the recording medium 23.

Performing image synthesis according to variation 18 when photographing a portrait will bring an image in which the face of the person, which is the major subject of the image, is focused and the background is out of focus (what is termed background vignette). A configuration in which the user can select two images to be used for synthesis will brings background vignette as the user desires. It should be understood that it may be configured to automatically perform the processing of variation 18 if photographing mode is set to the portrait mode.

(Variation 19)

Images may be synthesized so as to express motion of the subject. In variation 19, a plurality of images are obtained in different storage time for each of the images in "release process for synthesis." It should be understood that it is preferable to set an imaging sensitivity so as to uniform brightness state among the plurality of the images.

The CPU 21 in variation 19 displays a confirmation image of each image data before synthesis process on the monitor 17 in response to an operation signal from the operation member 18, and synthesizes designated plurality of image data in response to an operation signal for synthesis from the operation member 18. In the synthesis processing, a set of data at a pixel position and at corresponding pixel positions in the plurality of images are added. The image data after synthesis process is stored in the recording medium 23.

Performing image synthesis according to variation 19 when photographing, for example, splash of water or the like will bring an image which includes a blurring image of water drops (seems as if they are moving) and/or a still image of water drops. A configuration in which the user can select a plurality of images used for synthesis will brings expression as the user desires. It should be understood that it may be configured for the adding to be weighted in accordance with an operation by the user.

According to the first and second embodiments and variations described above, an electronic camera that performs image synthesis appropriately is achieved.

The above descriptions are examples. The present invention is not to be limited only to the embodiments and variations described above. The embodiments and variations may be combined as appropriate.

The above-described embodiments are examples, and various modifications can be made without departing from the scope of the invention.

What is claimed is:

1. An electronic camera, comprising:
an imaging device that captures a subject image and outputs image signals;
an image synthesizing device that performs image synthesis to generate a single image by using a plurality of sets of image signals obtained on different exposure values in response to a single imaging instruction by the imaging device;
a control device that determines whether or not to perform the image synthesis with the image synthesizing device based on a predetermined determination condition, and, when it is determined to perform the image synthesis, controls the image synthesizing device so as to perform the image synthesis to achieve an image with wide dynamic range; and
a photometric device that performs a photometric calculation using the image signals, wherein:
the control device decides a number of the plurality of sets of the image signals used for performing the image synthesis based on a difference between a maximum luminance value and a minimum luminance value obtained by the photometric calculation.

2. An electronic camera according to claim 1, wherein:
the control device determines whether or not to perform the image synthesis with the image synthesizing device based on a brightness distribution of an image obtained by the photometric calculation by the photometric device.

3. An electronic camera according to claim 2, wherein:
the control device determines whether or not to perform the image synthesis with the image synthesizing device using the difference between the maximum luminance value and the minimum luminance value obtained by the photometric calculation.

4. An electronic camera according to claim 1, wherein:
each of the plurality of sets of the image signals used by the image synthesizing device to perform the image synthesis are those obtained by the imaging device at a frame rate of more than several tens of frames per second in response to an instruction for photography.

5. An electronic camera according to claim 1,
the control device determines whether or not to perform the image synthesis with the image synthesizing device based on a maximum value or a minimum value of image signals captured by the imaging device in response to an instruction for photography, on an imaging condition based on average brightness of an image obtained by the photometric calculation by the photometric device.

6. An electronic camera according to claim 5, wherein:
the control device determines whether or not to perform the image synthesis with the image synthesizing device according to a number of image signals that exceed a first predetermined value among the image signals captured in response to the instruction for photography.

7. An electronic camera according to claim 5, wherein:
the control device determines whether or not to perform the image synthesis with the image synthesizing device according to a number of image signals that fall short of a second predetermined value among the image signals captured in response to the instruction for photography.

8. An electronic camera according to claim 1, wherein:
the control device determines whether or not to perform the image synthesis with the image synthesizing device according to a photographing mode that has been set on the electronic camera.

9. An electronic camera according to claim 1, wherein:
the image synthesizing device generates the single image that has a range of signal value wider than a range of signal value of each of the plurality of sets of the image signals used for the image synthesis.

10. An electronic camera according to claim 2, wherein:
the control device determines whether or not to perform the image synthesis with the image synthesizing device based on a brightness distribution of a live preview image obtained before an instruction for photography by the photometric calculation.

11. An electronic camera according to claim 10, wherein:
if the control device determines to perform the image synthesis with the image synthesizing device, the control device decides a number of the plurality of sets of the image signals used for the image synthesis and an imaging condition for obtaining the plurality of sets of the image signals, using a difference between a maximum luminance value and a minimum luminance value of image signals that make up a plurality of live preview images obtained on different imaging conditions by the imaging device.

12. An electronic camera according to claim 11, wherein:
a length of time required to obtain the plurality of sets of the image signals used for the image synthesis is displayed on a display device before the instruction for photography as a shutter speed.

13. An electronic camera according to claim 5, wherein:
if the control device determines to perform the image synthesis with the image synthesizing device, the control device controls the imaging device so as to obtain image signals on different imaging conditions, and, when the obtained image signals include equal to or more than a predetermined number of image signals which exceed a first predetermined value, or when the obtained image signals include equal to ore more than a predetermined number of image signals which fall short of a second predetermined value smaller than the first predetermined value, the control device controls the imaging device so as to obtain image signals on yet another different imaging condition.

14. An electronic camera, comprising:
an imaging device that captures a subject image and outputs image signals;
an image synthesizing device that performs image synthesis to generate a single image by using a plurality of sets of image signals obtained on different exposure values by the imaging device;
a photometric device that performs a photometric calculation using the image signals; and
a control device that determines whether or not to perform the image synthesis with the image synthesizing device based on a maximum value or a minimum value of image signals captured by the imaging device in response to an instruction for photography, on an imaging condition based on average brightness of an image obtained by the photometric calculation by the photometric device.

15. An electronic camera according to claim 14, wherein:
the control device determines whether or not to perform the image synthesis with the image synthesizing device according to a number of image signals that exceed a first predetermined value among the image signals captured in response to the instruction for photography.

16. An electronic camera according to claim 14, wherein:
the control device determines whether or not to perform the image synthesis with the image synthesizing device according to a number of image signals that fall short of a second predetermined value among the image signals captured in response to the instruction for photography.

17. An electronic camera, comprising:
an imaging device that captures a subject image and outputs image signals;
an image synthesizing device that performs image synthesis to generate a single image by using a plurality of sets of image signals obtained on different exposure values by the imaging device;
a control device that determines whether or not to perform the image synthesis with the image synthesizing device based on a predetermined determination condition, and, when it is determined to perform the image synthesis, controls the image synthesizing device so as to perform the image synthesis; and
a photometric device that performs a photometric calculation using the image signals, wherein:
the control device determines whether or not to perform the image synthesis with the image synthesizing device based on a brightness distribution of an image obtained by the photometric calculation by the photometric device; and
if the control device determines to perform the image synthesis with the image synthesizing device, the control device decides a number of the plurality of sets of the image signals used for the image synthesis and an imaging condition for obtaining the plurality of sets of the image signals, using a difference between a maximum luminance value and a minimum luminance value of image signals that make up a plurality of live preview images obtained on different imaging conditions by the imaging device.

18. An electronic camera according to claim 17, wherein:
a length of time required to obtain the plurality of sets of the image signals used for the image synthesis is displayed on a display device before the instruction for photography as a shutter speed.

* * * * *